3,316,276
N-(3-PYRROLIDINYL)-PHTHALIMIDE
DERIVATIVES
Grover C. Helsley, Richmond, Va., assignor to A. H. Robins Company, Inc., Richmond, Va., a corporation of Virginia
No Drawing. Filed Oct. 6, 1965, Ser. No. 494,304
13 Claims. (Cl. 260—326)

This invention relates to a series of novel N-substituted phthalimide compounds, particularly N-(substituted-3-pyrrolidinyl)-phthalimides, therapeutic compositions containing the same as active ingredients and methods of making and therapeutically administering said compounds and compositions.

The novel compounds described hereinafter have utility as physiologically active agents and particularly as effective antiarrhythmic agents, therapeutically applicable in the treatment of cardiac arrhythmias.

It is accordingly an object of the present invention to provide novel compounds which have a high degree of antiarrhythmic activity. An additional object is the provision of compounds having antiarrhythmic activity and which produce minimal side effects. Another object is to provide certain novel N-(substituted-3-pyrrolidinyl)-phthalimides. A further object is to provide a method of using said antiarrhythmic agents in the treatment of living animal and especially mammalian bodies. A still further object is to provide pharmaceutical compositions which embody the said agents. A still further object is to provide a method for preparing said novel N-(substituted-3-pyrrolidinyl)-phthalimides. Additional objects will be apparent to one skilled in the art and still other objects will become apparent hereinafter.

The novel chemical compounds of this invention are represented by the following structure formula:

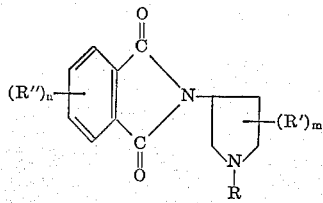

wherein R is a member of the group consisting of hydrogen, lower alkyl, aryl, aralkyl and alicyclyl; R' is a member of the group consisting of hydrogen and lower alkyl; R'' is a member of the group consisting of hydrogen, halogen having an atomic weight less than 80, trifluoromethyl, lower alkyl and lower alkoxy; $m$ is 0–2 and $n$ is 0–4.

The terms "lower alkyl" and "lower alkoxy" as used herein include straight and branched chain radicals of from 1 to 4 carbon atoms inclusive.

Examples of lower alkyl radicals are methyl, ethyl, propyl, N-butyl, isopropyl, isobutyl and tertiary butyl. Suitable lower alkoxy radicals are methoxy, ethoxy, propoxy, isopropoxy, and butoxy. Aryl radicals include the unsubstituted phenyl radical and phenyl radicals substituted by any radical or radicals which are not reactive or otherwise interfering under the conditions of the reaction, such as nitro, lower alkyl, trifluoromethyl, halo, and the like. Included in the term aralkyl are lower-alkyl substituted monocarbocyclic aryl groups such as benzyl, phenethyl, methylbenzyl, phenpropyl, and the like. Alicyclic radicals include such groups as cyclobutyl, cyclohexyl, cyclopentyl, ethylcyclopentyl, and cycloheptyl.

This invention also includes pharmaceutically acceptable acid addition salts of the above defined bases formed with nontoxic organic and inorganic acids. Such salts are easily prepared by methods known to the art. The base is reacted with either the calculated amount of organic or inorganic acid in aqueous miscible solvent, such as ethanol or isopropanol, with isolation of the salt by concentration and cooling or an excess of the acid in aqueous immiscible solvent, such as ethyl ether or isopropyl ether, with the desired salt separating directly. Exemplary of such organic salts are those with maleic, fumaric, benzoic, ascorbic, pamoic, succinic, methane-sulfonic, acetic, propionic, tartaric, citric, lactic, malic, citraconic itaconic, p-aminobenzoic, glutamic, stearic and the like. Exemplary of such inorganic salts are those with hydrochloric, hydrobromic, sulfuric, sulfamic, phosphoric and nitric acids.

In addition this invention includes pharmaceutically acceptable, nontoxic quaternary ammonium salts of the above defined bases. The quaternary ammonium salts are readily formed by treatment of the corresponding free base with the appropriate salt-forming substance, including, for example, methyl chloride, methyl bromide, methyl iodide, methyl sulfate, ethyl chloride, ethyl bromide, ethyl iodide, n-propyl chloride, n-propyl bromide, n-propyl iodide, isopropyl iodide, n-butyl chloride, n-butyl bromide, isobutyl bromide, sec-butyl bromide, n-amyl chloride, isoamyl chloride, n-amyl bromide, isoamyl bromide, n-amyl iodide, isoamyl iodide, n-hexyl chloride, isohexyl chloride, n-hexyl bromide, isohexyl bromide, n-hexyl iodide, isohexyl iodide, or similar quaternary salt-forming substances, according to general procedures which are well known in the art.

It will be readily apparent to one skilled in the art that certain compounds of this invention may be present as optical isomers. The connotation of the general formulas presented herein is to include all isomers, the separated d or l isomers as well as the dl mixtures of these isomers.

In general, the novel compounds of this invention are prepared by reacting a selected 3-halopyrrolidine substituted at one or more positions with a lower alkyl radical or a selected 3-pyrrolidinyl tosylate substituted at one or more positions on the pyrrolidine nucleus with a lower alkyl radical with an appropriately substituted phthalimide compound in the form of its alkali metal salt in accordance with the following graphic equation:

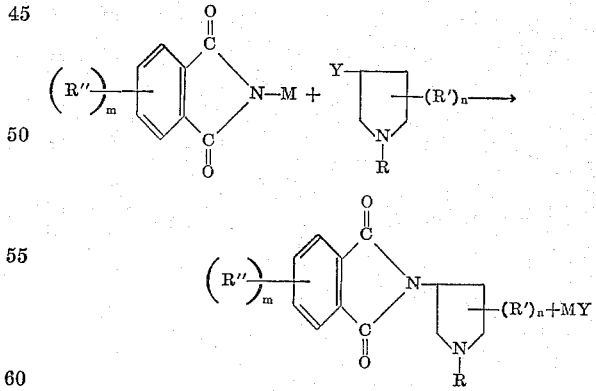

wherein R, R' and R'' have the same meaning ascribed to them above, M is preferably sodium or potassium and Y is preferably halogen or arylsulfonate.

In the preferred method of preparing the present compounds, the reaction materials and conditions for the above identified reactions are generally as follows:

The 3-halopyrrolidines substituted at one or more positions with a lower alkyl radical or the 3-pyrrolidinyl arylsulfonates substituted at one or more positions on the pyrrolidine nucleus with a lower alkyl radical used as starting materials for the preparation of the new N-(substituted-3-pyrrolidinyl)-phthalimides of the present invenn can be prepared in accordance with the methods de-
ibed in "Synthesis and Anticholinergic Activity of
ter Derivatives of Substituted 3-Pyrrolidinols" by Ryan
d Ainsworth, J. Org. Chem., 27, 2901 (1962), "4-(β-
bstituted Ethyl)-3,3-Diphenyl-2-Pyrrolidinones. A new
ries of CNS Stimulants" by Lunsford et al., J. Med.
em. 7, 302 (1964) and in U.S. patent application
). 422,570, filed Dec. 31, 1964, by Carl D. Lunsford
d Albert D. Cale, Jr. entitled, "Heterocyclic Organic
mpounds, Intermediates Therefore and Products and
e Thereof," all of which publications are hereby in-
rporated by reference as if fully set out herein.

The compounds of the present invention are prepared
dissolving the substituted 3-halopyrrolidine or the sub-
tuted 3-pyrrolidinyl arylsulfonate in and suspending the
etalated substituted phthalimide in a suitable solvent
ch as dimethyl sulfoxide, methanol, ethanol, benzene,
luene, and the like, which will not enter into the reac-
on, but which will provide a reaction medium. The
nount of solvent used will depend to a certain extent
on the equipment used. Generally speaking, however,
out 5 parts of solvent per part of the phthalimide and
out 1 to 2 parts of solvent per part of the pyrrolidine
mpound are used.

The reactants, dissolved and suspended as described
ove, are then admixed by treating dropwise over a
eriod of about 30 minutes the stirred metalated phthal-
lide suspension at 65–115° C. with the desired pyrroli-
ne compound. In an alternative method the reactants
d solvent are mixed together at room temperature.

The resulting reaction mixture is stirred for a period
time necessary to effect the formation of the N-substi-
ted phthalimide, usually about 16 hours. There is no
iticality about the temperature of the reaction mixture
it 110–115° C. is the preferred reaction temperature.

Isolation and purification of the compounds of the
esent invention is best achieved by stripping the reac-
on mixture of solvent and distilling the residual oily ma-
rial or precipitating the crude product by diluting the
oled reaction mixture with a large excess of water and
urifying the compounds from a suitable solvent. Prod-
ct work-up by other procedures is also feasible in ac-
rdance with presently available information and such
ther methods are equally within the purview of this
vention insofar as they embody the novel methods here-
disclosed.

The activity of the pharmacologically active agents of
e present invention, as evidenced by tests in mammals
indicative of their usefulness for veterinary purposes,
nd of similar utility in human beings as well. It will
e, however, clearly understood that the distribution and
arketing of any compound or composition falling with-
the scope of the present invention for use in human
eings will, of course, be subject to prior approval by
e U.S. Food and Drug Administration.

The invention is illustrated by the following examples
which, it is to be understood, are merely illustrative and
hould not be taken in a limiting sense.

EXAMPLE 1

*N-(1-cyclohexyl-3-pyrrolidinyl)-phthalimide*

To a rapidly stirred suspension of 185 g. (1.0 mole)
f potassium phthalimide in 1000 ml. of dimethyl sulfox-
de at 90° C. was added slowly 188 g. (1.0 mole) of 3-
hloro-1-cyclohexyl pyrrolidine. The mixture was heated
vith stirring for 16 hrs. at 112–115° C. and then filtered
vhile hot to remove the inorganic salt. The crystalline
roduct which separated from the cooled filtrate was col-
ected and dried under vacuum. After crystallization
rom an iso-octane-benzene mixture the dried product
veighed 151 g. (51% yield) and melted at 112.5–114°
C. The analytical sample melted at 113–114° C. after it
vas recrystallized from the same solvent system.

*Analysis.*—Calculated for $C_{18}H_{22}N_2O_2$: C, 72.45; H, 7.43; N, 9.39. Found: C, 72.53; H, 7.33; N, 9.44.

N-(1-cyclohexyl-3-pyrrolidinyl)-phthalimide ethiodide
was prepared in 59% yield and melted at 186–187.5° C.
after several recrystallizations from isopropanol-isopropyl
ether.

*Analysis.*—Calculated for $C_{20}H_{27}IN_2O_2$: C, 48.01; H, 5.29; N, 7.00. Found: C, 47.75; H, 5.57; N, 7.22.

The maleate salt was prepared using isopropanol as a
solvent and melted at 167–168.5° C.

The hydrochloride salt was prepared using isopropanol-
isopropyl ether as solvents and melted at 191–194° C.

PHARMACOLOGY

A male mongrel dog (wt. 9.4 kg.) was anesthetized with
intravenous phenobarbital sodium, the thorax was opened
between the third and fourth ribs on the right side and
the animal artificially respired with a Palmer pump. The
Grass polygraph and accessory equipment were used for
recording carotid arterial blood pressure, jugular venous
blood pressure, the electrocardiogram, respiration, intes-
tinal motility, activity of the urinary bladder and urinary
flow. The pericardium was opened and arranged to form
a cradle in which the heart rested. Aconitine (0.25 mg.)
was injected into the wall of the right atrium. After an
arrythmia (usually a 2:1 rhythm with a ventricular rate
of at least 200 beats/minute) had been established and
persisted for 20 minutes, an aqueous solution of N-(1-
cyclohexyl-3-pyrrolidinyl)-phthalimide (conc. 9.4 mg./
ml.) containing 1 equivalent of hydrochloric acid was
given by infusion through the femoral vein at a constant
rate of 1 ml./min. Normal sinus rhythm was restored
after a dose of 2 mg./kg. (18.8 mg.) had been given. In
the same dog a dose of 20 mg./kg. (198 mg.) of the
known antiarrhythmic agent Pronestyl failed to cause re-
version of aconitine-induced arrthythmia to a normal sinus
rhythm.

In a general pharmacodynamic study the most pro-
nounced effect of N-(1-cyclohexyl-3-pyrrolidinyl)-phthal-
imide was a relatively transient lowering of the blood
pressure.

EXAMPLE 2

*N-(1-ethyl-3-pyrrolidinyl)-phthalimide*

3-chloro-1-ethylpyrrolidine (264 g.; 2.0 moles) in 250
ml. of dimethyl sulfoxide was added slowly to a rapidly
stirred suspension of 370 g. (2.0 moles) of potassium
phthalimide in 1500 ml. of dimethyl sulfoxide at 90° C.
The reaction mixture was stirred for 16 hours at 110–
115° C. and then the solvent was distilled out of the reac-
tion mixture at reduced pressure. The residue was dis-
tilled in vacuo and the fraction distilling at 143–145° C./
0.02 mm. was collected separately. The distillate which
crystallized on standing weighed 284 g. (58% yield) and
melted at 105–109° C. Several recrystallizations from
isooctane raised the melting point to 110–112° C.

*Analysis.*—Calculated for $C_{14}H_{16}N_2O_2$: C, 68.83; H, 6.60; N, 11.47. Found: C, 69.11; H, 6.56; N, 11.30.

PHARMACOLOGY

A male mongrel dog (10.1 kg.) was anesthetized with
intravenous phenobarbital sodium, the thorax was opened
between the third and fourth ribs on the right side and
the animal artificially respired with a Palmer pump. The
necessary equipment as described in Example 1 to obtain
a complete pharmacodynamic profile was used. The peri-
cardium was opened and arranged to form a cradle in
which the heart rested. Injection of 0.25 mg. of aconitine
into the wall of the right atrium produced an arrhythmia
(a 2:1 rhythm with ventricular rate of 200 beats/minute).
After the arrhythmia had been established for 20 minutes
an aqueous solution of N-(1-ethyl-3-pyrrolidinyl)-phthal-
imide (conc. 10.1 mg./ml.) containing 1 equivalent of
hydrochloric acid was administered by infusion through
the femoral vein at a constant rate of 1 ml./min. Three
aconitine induced arrhythmias were restored to normal
sinus rhythm after doses of 2.3 mg./kg. (23.23 mg.), 1.3
mg./kg. (13.13 mg.) and 1.5 mg./kg. (15.15 mg.) respectively. Pronestyl also restored the normal sinus rhythm but 10 mg./kg. (101 mg.) was necessary.

A male mongrel dog (wt. 12.8 kg.) was prepared as in the preceding paragraph and an arrhythmia produced by crusing an area in the region of the sinoatrial mode and then stimulating the area electrically. Normal sinus rhythm was restored when a total of 3 mg./kg. (38.4 mg.) of N-(1-ethyl-3-pyrrolidinyl)-phthalimide had been infused through the femoral vein.

EXAMPLE 3

N-(1-methyl-3-pyrrolidinyl)-phthalimide

To a rapidly stirred suspension of 139 g. (0.075 mole) of potassium phthalimide in 400 ml. of dimethyl sulfoxide at 90° C. was added dropwise 90 g. (0.075 mole) of 3-chloro-1-methylpyrrolidine. The mixture was heated with stirring for 16 hours, cooled, and filtered to remove the inorganic salt. The solvent was evaporated and 18 g. of the residual oil (133 g.) was distilled at reduced pressure. The fraction boiling at 116–118° C./0.02 mm. was collected. The product which crystallized on standing was recrystallized several times from isooctane. The white compound melted at 92–95° C. and weighed 7.0 g. (29% yield). The analytically pure sample melted at 94.5–95.5° C. after crystallization from isopropyl ether.

*Analysis.*—Calculated for $C_{13}H_{14}N_2O_2$: C, 67.81; H, 6.13; N, 12.17. Found: C, 67.54; H, 6.06; N, 12.19.

EXAMPLE 4

N-(1-isopropyl-3-pyrrolidinyl)-phthalimide

A rapidly stirred mixture of 118 g. (0.80 mole) of 3-chloro-1-isopropylpyrrolidine, 148 g. (0.80 mole) of potassium phthalimide and 700 ml. of dimethyl sulfoxide was heated at 110–113° C. for 16 hours and filtered while hot to remove the inorganic salt. The crystalline product which formed when the dark red solution was cooled and treated with ca. 100 ml. of water was collected and washed with cold water. The off-white crystalline product weighed 105 g. (51% yield) and melted at 130–134° C. Several recrystallizations form isooctane-benzene gave colorless material melting at 134–135.5° C.

*Analysis.*—Calculated for $C_{15}H_{18}N_2O_2$: C, 69.74; H, 7.02; N, 10.85. Found: C, 69.59; H, 7.07; N, 10.74.

EXAMPLE 5

N-(1-phenyl-3-pyrrolidinyl)-phthalimide

A stirred mixture of 190 g. (0.60 mole) of 1-phenyl-3-pyrrolidinyl tosylate and 111 g. (0.60 mole) of potassium phthalimide in 1000 ml. of dimethyl sulfoxide was heated at 65° C. for 7 hours. The material which separated from the cooled reaction mixture was collected, washed with 50% dimethyl sulfoxide-water and then with water. A second crop was obtained on further dilution of the filtrate with water and was purified by recrystallization from benzene-petroleum ether (30–60° C.). The pure material melted at 151–153° C.; total yield, 97.7 g. (55%).

*Analysis.*—Calculated for $C_{18}H_{16}N_2O_2$: C, 73.95; H, 5.52; N, 9.58. Found: C, 73.91; H, 5.45; N, 9.66.

EXAMPLE 6

N-(1-benzyl-3-pyrrolidinyl)-phthalimide

To a rapidly stirred suspension of 288 g. (1.23 moles) of potassium phthalimide in 800 ml. of dimethyl sulfoxide at 90° C. was added slowly 240 g. (1.23 moles) of 1-benzyl-3-chloropyrrolidine. The mixture was heated with stirring for 16 hours and then filtered hot to remove the inorganic salt. The crystalline product which separated from the cooled filtrate was collected and dried. The white compound weighed 182 g. (48% yield) and melted at 130–132° C. Recrystallization from benzene-isooctane raised the melting point to 131–132° C.

*Analysis.*—Calculated for $C_{19}H_{18}N_2O_2$: C, 74.49; H, 5.92; N, 9.15. Found: C, 74.51; H, 6.01; N, 9.08.

EXAMPLE 7

N-(1-phenethyl-3-pyrrolidinyl)-phthalimide 3-chloro-1-phenylethylpyrrolidine (258 g., 1.23 moles) was added slowly to a rapidly stirred suspension of potassium phthalimide (288 g., 1.23 moles) in dimethyl sulfoxide (800 ml.) while maintaining the temperature at 90°. The heated mixture was stirred for 16 hours and then filtered while hot to remove the inorganic salt. The product was isolated and purified in the usual manner.

EXAMPLE 8

4-chloro-N-(1-cyclohexyl-3-pyrrolidinyl)-phthalimide 3-chloro-1-cyclohexylpyrrolidine (188 g., 1.0 mole) was added slowly to a rapidly stirred suspension of potassium 4-chlorophthalimide (219.5 g., 1.0 mole) in dimethyl sulfoxide (1 liter) while maintaining the temperature at 90° C. The reaction mixture was stirred for 16 hours maintaining the temperature at 112–115° C. and then filtered while hot to remove the inorganic salt. The product was isolated and purified in the appropriate manner.

EXAMPLE 9

N-(1-phenyl-2-methyl-3-pyrrolidinyl)-phthalimide

To a well-stirred suspension of 114 g. (0.665 mole) of potassium phthalimide in 400 ml. of dimethyl sulfoxide was added slowly 97.5 g. (0.665 mole) of 1-phenyl-2-methyl-3-chloropyrrolidine. The mixture was heated with stirring for 15 hours and filtered while hot to remove the inorganic salt. The product was isolated by concentrating the filtrate, cooling and adding water to the point of crystallization. The product was collected and dried.

EXAMPLES 10–41

By following the principles of the manipulative procedures described in the preceding examples and using the alkali metal salt of appropriately substituted phthalimides and various substituted 3-chloropyrrolidines or 3-pyrrolidinyl aryl sulfonates, the following compounds are prepared:

4-trifluoromethyl-N-(1-phenyl-3-pyrrolidinyl)-phthalimide
4-trifluoromethyl-N-(1-cyclohexyl-3-pyrrolidinyl)-phthalimide
4,5-dimethoxy-N-(1-phenyl-3-pyrrolidinyl)-phthalimide
4-methoxy-N-(1-cyclohexyl-3-pyrrolidinyl)-phthalimide
4-bromo-N-(1-ethyl-4-methyl-3-pyrrolidinyl)-phthalimide
4-bromo-N-(1-ethyl-3-pyrrolidinyl)-phthalimide
4-bromo-N-(1-cyclohexyl-3-pyrrolidinyl)-phthalimide
4,5-dimethoxy-N-(1-cyclohexyl-3-pyrrolidinyl)-phthalimide
4,5-dimethoxy-N-(1-cyclohexyl-4-methyl-3-pyrrolidinyl)-phthalimide
4,5-diethyl-N-(1-ethyl-3-pyrrolidinyl)-phthalimide
4,5-dimethyl-N-(1-ethyl-3-pyrrolidinyl)-phthalimide
4,5-diethyl-N-(1-phenyl-3-pyrrolidinyl)-phthalimide
4,5-diethyl-N-(4-methyl-1-phenyl-3-pyrrolidinyl)-phthalimide
4,5-diethoxy-N-(1-phenyl-3-pyrrolidinyl)-phthalimide
4,5-diethoxy-N-(4-methyl-1-phenyl-3-pyrrolidinyl)-phthalimide
4,5-diethoxy-N-(1-cyclohexyl-3-pyrrolidinyl)-phthalimide
4,5-diethoxy-N-(1-phenethyl-3-pyrrolidinyl)-phthalimide
4,5-diethoxy-N-(1-benzyl-3-pyrrolidinyl)-phthalimide
4,5-diethoxy-N-(5-methyl-1-phenyl-3-pyrrolidinyl)-phthalimide
4,5-diethoxy-N-(1-isopropyl-3-pyrrolidinyl)-phthalimide
4-methyl-N-(1,2,2-trimethyl-3-pyrrolidinyl)-phthalimide
3-methyl-N-(5-methyl-1-phenyl-3-pyrrolidinyl)-phthalimide
3,5-dichloro-N-(1-benzyl-3-pyrrolidinyl)-phthalimide
3,4-dibromo-N-(1-benzyl-3-pyrrolidinyl)-phthalimide
3,4,5,6-tetrachloro-N-(1-methyl-3-pyrrolidinyl)-phthalimide 4,5-trichloro-N-(1-ethyl-3-pyrrolidinyl)-phthalimide
4,5-trichloro-N-(1,2,2-trimethyl-3-pyrrolidinyl)-phthalimide
5-dichloro-N-(1-benzyl-2,2-dimethyl-3-pyrrolidinyl)-phthalimide
4,5-trimethyl-N-(1-ethyl-3-pyrrolidinyl)-phthalimide
ethoxy-N-(1-phenethyl-4-methyl-3-pyrrolidinyl)-phthalimide
5-dibromo-N-(1-phenethyl-4,5-dimethyl-3-pyrrolidinyl)-phthalimide
trifluoromethyl-N-(1-cyclohexyl-2-methyl-3-pyrrolidinyl)-phthalimide.

The invention further provides pharmaceutical compositions comprising, as active ingredients, at least one of the compounds according to the invention in association with a pharmaceutical carrier or excipient. The compounds are thus presented in a form suitable for oral, rectal, parenteral or intracardial administration, or in a form suitable for inhalation. Thus, for example, compositions for oral administration are solid or liquid and can take the form of capsules, tablets, coated tablets, suspensions, etc., such carriers or excipients conveniently used in the pharmaceutical art. Suitable tableting excipients include lactose, potato and maize starches, talc, gelatin and stearic and silicic acids, magnesium stearate and polyvinyl pyrrolidone.

For parenteral administration, the carrier or excipient can be a sterile, parenterally acceptable liquid, e.g. water, or a parenterally acceptable oil, e.g. arachis oil, contained in ampoules.

In compositions for rectal administration, the carrier can comprise a suppository base, e.g. cocoa butter, or a glyceride.

Advantageously, the compositions are formulated as dosage units, each unit being adapted to supply a fixed dose of active ingredient. Tablets, coated tablets, capsules, ampoules and suppositories are examples of preferred dosage unit forms according to the invention. Each dosage unit adapted for oral administration may conveniently contain 25 to 900 mg., and preferably 100 to 500 mg., of the active ingredient; each dosage unit adapted for intracardial, intravenous, or inhalation administration may conveniently contain 10 to 280 mg., and preferably 50 to 200 mg. of the active ingredient; whereas each dosage unit adapted for intramuscular administration may conveniently contain 20 to 400 mg. and preferably 100 to 300 mg. of the active ingredient.

Examples of compositions within the preferred ranges given are as follows:

SYRUP

Ingredients: Amt./5 cc.
(1) Active ingredient _____ mg__ 500
(2) Glycerin _____ ml__ 1.2500
(3) Sorbitol solution 70% _____ ml__ 2.5000
(4) Sodium sacharrin _____ mg__ 1.000
(5) Sodium sucaryl _____ mg__ 10.000
(6) Methyl p-aminobenzoate _____ mg__ 5.000
(7) Propyl p-aminobenzoate _____ mg__ 0.2500
(8) Curaca flavor _____ ml__ 0.0025
(9) Water, q.s. _____ ml__ 5.000

Procedure:

(1) Dissolve 6 and 7 in hot water.
(2) This solution, when cool, is mixed with #3 and the mixture is stirred until uniform.
(3) Dissolve 1, 2, 4, 5 and 8 in this solution and stir until uniform.

CAPSULES

Ingredients: Per cap., mg.
(1) Active ingredient _____ 250.000
(2) Lactose _____ 146.000
(3) Magnesium stearate _____ 4.000

Procedure:
(1) Blend 1, 2 and 3.
(2) Mill this blend and blend again.
(3) This milled blend is then filled into #1 hard gelatin capsules.

TABLETS

Ingredients: Mg. tab., mg.
(1) Active ingredient _____ 200.0
(2) Corn starch _____ 20.0
(3) Kelacid _____ 20.0
(4) Keltose _____ 20.0
(5) Magnesium stearate _____ 1.3

Procedure:
(1) Blend 1, 2, 3 and 4.
(2) Add sufficient water portionwise to the blend from step #1 with careful stirring after each addition. Such additions of water and stirring continue until the mass is of a consistency to permit its conversion to wet granules.
(3) The wet mass is converted to granules by passing it through the oscillating granulator, using 8-mesh screen.
(4) The wet granules are then dried in an oven at 140° F.
(5) The dried granules are then passed through an oscillating granulator, using a 10-mesh screen.
(6) Lubricate the dry granules with 0.5% magnesium stearate.
(7) The lubricated granules are compressed on a suitable tablet press.

INTRAVENOUS INJECTION

Ingredients: Per ml.
(1) Active ingredient _____ 50.0 mg.
(2) pH 4.0 buffer solution _____ q.s. to 1.0 ml.

Procedure:
(1) Dissolve the active ingredient in the buffer solution.
(2) Aseptically filter the solution from step #1.
(3) The sterile solution is now aseptically filled into sterile ampuls.
(4) The ampuls are sealed under aseptic conditions.

INTRAMUSCULAR INJECTION

Ingredients: Per ml.
(1) Active ingredient _____ 50.0 mg.
(2) Isotonic buffer solution 4.0 _____ q.s. to 2.0 ml.

Procedure:
(1) Dissolve the active ingredient in the buffer solution.
(2) Aseptically filter the solution from step #1.
(3) The sterile solution is now aseptically filled into sterile ampuls.
(4) The ampuls are sealed under aseptic conditions.

SUPPOSITORIES

Ingredients: Per supp., mg.
(1) Active ingredient _____ 200.0
(2) Polyethylene glycol 1000 _____ 1350.0
(3) Polyethylene glycol 400 _____ 450.0

Procedure:
(1) Melt 2 and 3 together and stir until uniform.
(2) Dissolve #1 in the molten mass from step 1 and stir until uniform.
(3) Pour the molten mass from step 2 into suppository molds and chill.
(4) Remove the suppositories from molds and wrap.

INHALATION

Ingredients: Amt./cc.
(1) Active ingredient _____ mg__ 100
(2) Alcohol 95% q.s. _____ cc__ 1.0

Procedure:
(1) Dissolve #1 and #2.
(2) This solution is properly packaged in an aerosol dispenser containing a metered valve and a suitable propellant.

Various modifications and equivalents will be apparent to one skilled in the art and may be made in the compounds, method, and compositions of the present invention without departing from the spirit or scope thereof, and it is therefore to be understood that the invention is to be limited only by the scope of the appended claims.

What is claimed and desired to be secured by U.S. Letters Patent is:

1. A compound selected from the group consisting of N-substituted phthalimides having the structural formula:

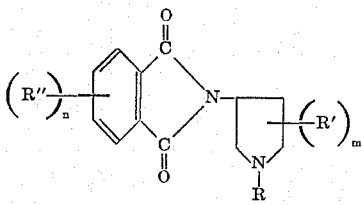

wherein R is a member selected from the group consisting of hydrogen, lower alkyl, aryl, aralkyl and alicyclyl,
wherein R′ is lower alkyl;
wherein R″ is a member selected from the group consisting of halogen having an atomic weight less than 80, trifluoromethyl, lower alkyl and lower alkoxyl;
wherein $m$ is 0–2 and $n$ is 0–4,
wherein aryl has a maximum of 12 carbon atoms and a phenyl ring with substituents selected from the group consisting of hydrogen, trifluoromethyl, halogen having an atomic weight less than 80,
wherein aralkyl has a phenyl-lower alkyl radical and a maximum of nine carbon atoms,
wherein alicyclyl has a saturated ring having from four to seven carbon atoms and a maximum of nine carbon atoms and acid addition and quaternary ammonium salts thereof.

2. A compound of the formula

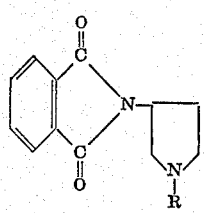

wherein R is lower alkyl.

3. A compound of the formula

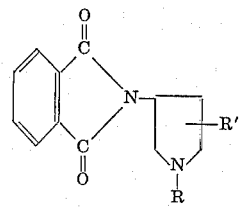

wherein R is lower alkyl and R′ is lower alkyl.

4. A compound of the formula

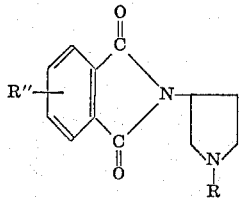

wherein R is lower alkyl and R″ is halogen.

5. A compound of the formula

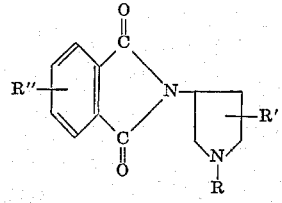

wherein R is lower alkyl, R′ is lower alkyl and R″ is halogen.

6. N-(1-methyl-3-pyrrolidinyl) phthalimide.
7. N-(1-ethyl-3-pyrrolidinyl) phthalimide.
8. N-(1-isopropyl-3-pyrrolidinyl) phthalimide.
9. N - (1 - isopropyl-2-methyl-3-pyrrolidinyl) phthalimide.
10. 4 - chloro - N-(1-isopropyl-3-pyrrolidinyl) phthalimide.
11. 4-chloro-N-(1 - isopropyl-2-methyl-3-pyrrolidinyl) phthalimide
12. N-(1-benzyl-3-pyrrolidinyl) phthalimide.
13. N-(1-cyclohexyl-3-pyrrolidinyl) phthalimide.

References Cited by the Examiner

UNITED STATES PATENTS

| 3,137,705 | 6/1964 | Prelog et al. | 260—326 |
| 3,201,472 | 8/1965 | Spivack | 260—326 |

ALEX MAZEL, *Primary Examiner.*

NICHOLAS S. RIZZO, *Examiner.*

MARY U. O'BRIEN, *Assistant Examiner.*